June 18, 1957 A. F. WOOD 2,796,514
WELDING ELECTRODE HOLDER AND ELECTRODE THEREFOR
Filed June 24, 1952 2 Sheets-Sheet 2
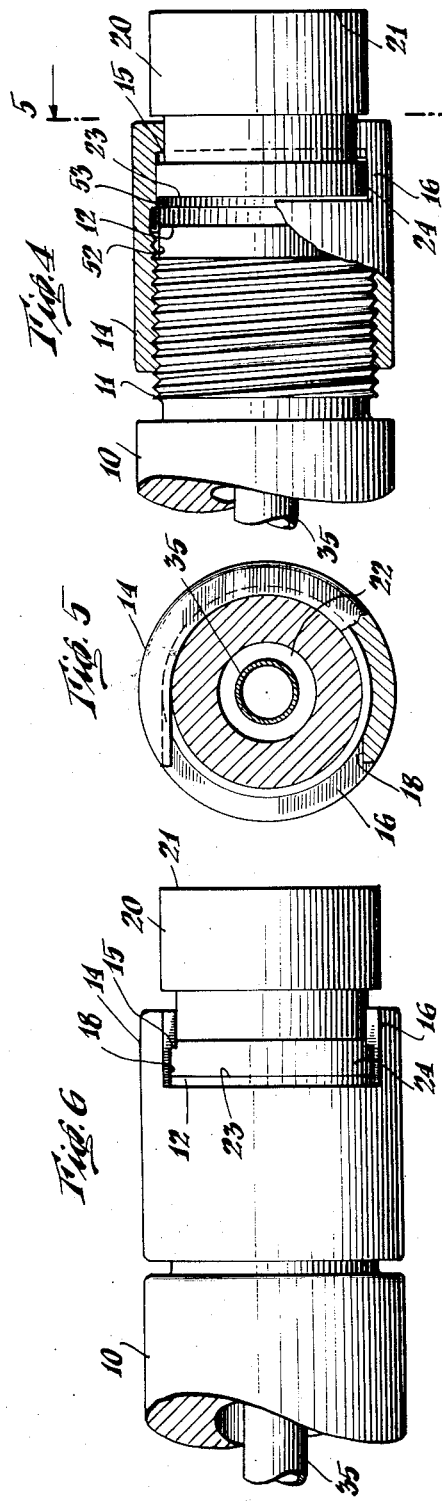
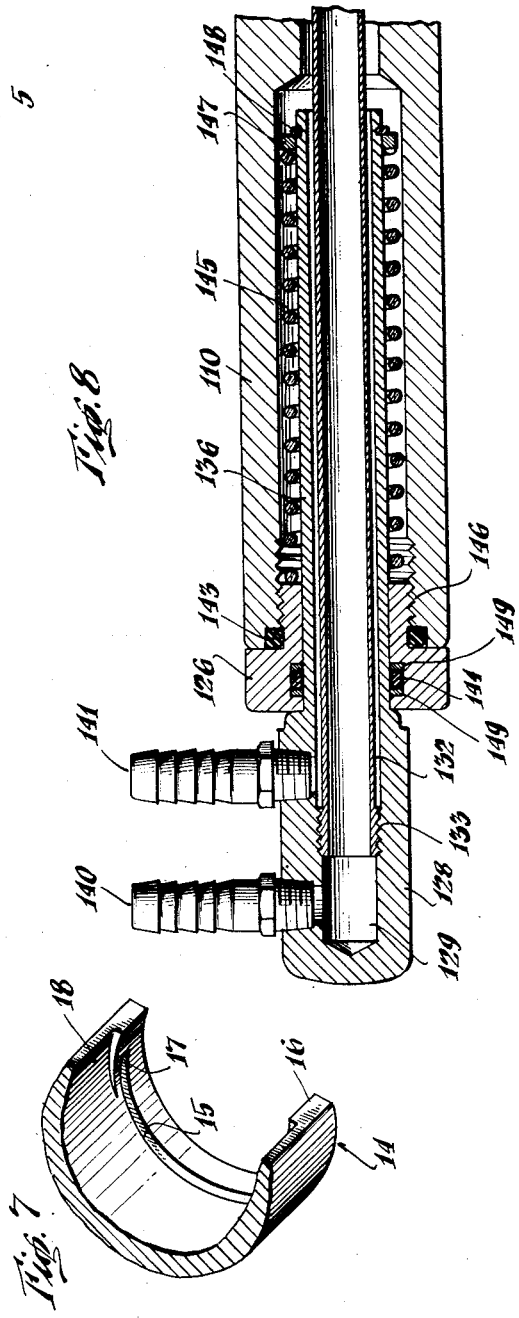
INVENTOR.
Arthur F. Wood
BY
ATTORNEY United States Patent Office 2,796,514
Patented June 18, 1957

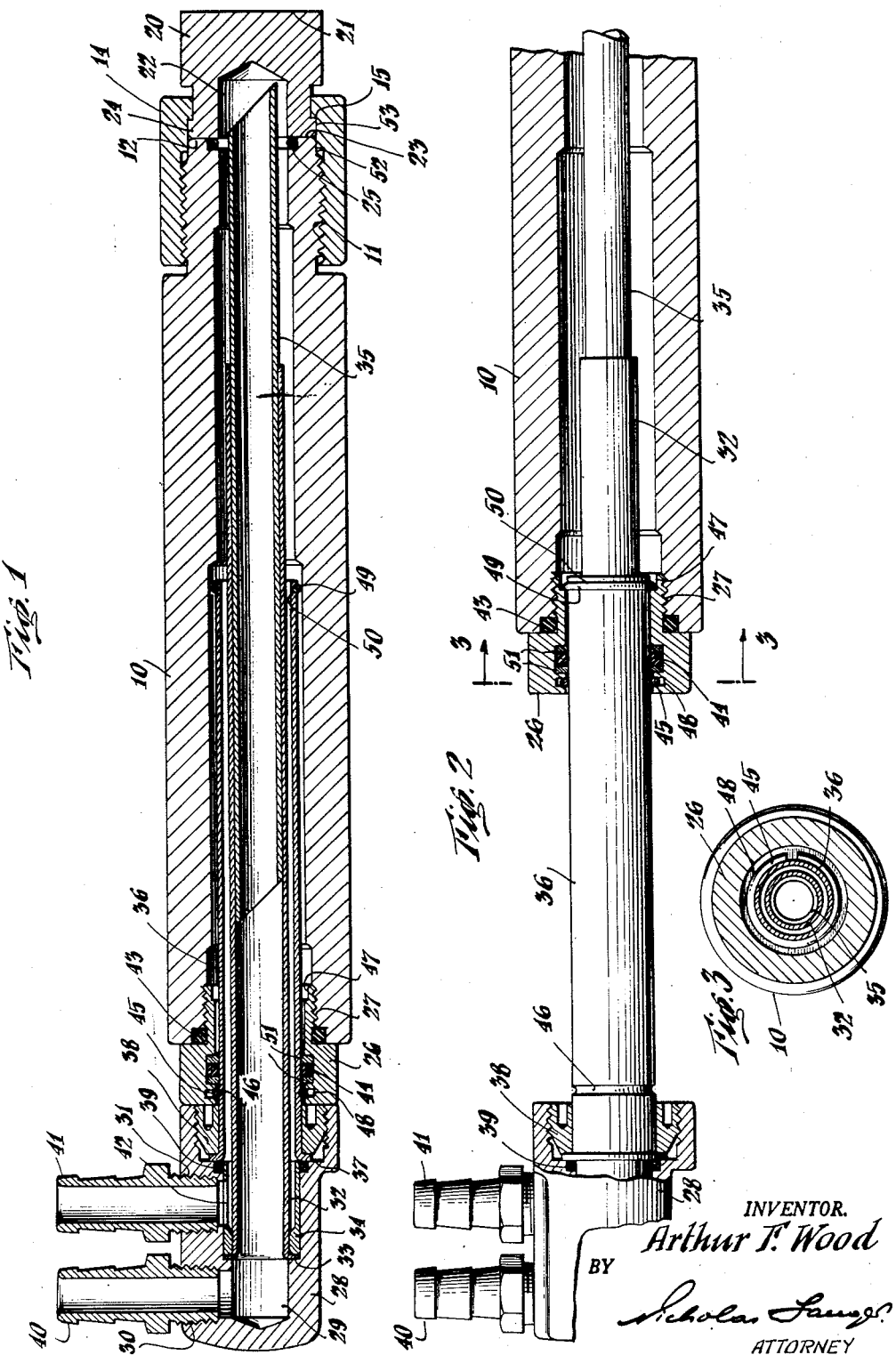

2,796,514
WELDING ELECTRODE HOLDER AND ELECTRODE THEREFOR

Arthur F. Wood, Indianapolis, Ind., assignor to P. R. Mallory & Co. Inc., Indianapolis, Ind., a corporation of Delaware Application June 24, 1952, Serial No. 295,261

4 Claims. (Cl. 219—120)

The present invention relates to welding electrode holders, and, more particularly, to electrode holders for high pressure resistance welding applications and to a novel cap electrode therefor.

Conventional welding electrode holders generally comprised a tubular member or barrel having a tapered seat at one end thereof adapted to receive the correspondingly tapered shank of a welding electrode or tip. While electrode holders of this type were used on a very substantial scale in the industry, they were in some cases the source of operating difficulties. The fit between the holder and its tip was either too loose to be secure or it was excessively tight so that when it was desired to replace the worn electrode with a new one, such change could be accomplished only with considerable difficulty. These difficulties were accentuated in the case of welding applications where very high pressures were employed. Since the present trend in the welding industry is definitely in the direction of employing increasingly higher welding pressures, this gave rise to a problem for which so far no satisfactory solution has been found.

It has been discovered that the outstanding problem may be solved in a remarkably simple manner.

It is an object of the present invention to provide a novel and improved welding electrode which eliminates the foregoing difficulties.

It is another object of the present invention to provide an improved welding electrode holder to which an electrode or tip may be readily attached and from which such electrode may be readily removed, regardless of the amount of welding pressure employed.

It is a further object of the present invention to provide a novel welding electrode holder and special cap electrode therefor, said holder having means for securely maintaining the electrode or tip in its operative position and to permit removal of such electrode or tip in the lateral direction without requiring any wrenches or other hand tools.

The invention also contemplates a welding electrode and holder therefor which is simple in construction, reliable in its operation and which may be readily manufactured on an industrial scale at a low cost.

Other and further objects and advantages of the present invention will become apparent from the following description taken in conjunction with the accompanying drawings in which Fig. 1 is a longitudinal sectional view of a welding electrode holder and electrode embodying the principles of the present invention;

Fig. 2 is a similar view, somewhat fragmentary in character and having parts in elevation, of the holder shown in Fig. 1, with the fluid circulating means in their retracted position;

Fig. 3 is a section taken on line 3—3 of Fig. 2;

Fig. 4 is an enlarged sectional detail view of the electrode holding end portion of the holder of Fig. 1;

Fig. 5 is a section taken on line 5—5 of Fig. 4;

Fig. 6 is a side elevation of the end portion of the holder shown in Fig. 4;

Fig. 7 is a fragmentary perspective view of the adaptor nut forming part of the electrode holder structure shown in Figs. 1-6; and Fig. 8 is a view similar to Fig. 1, somewhat fragmentary in character, of a modified embodiment of the invention.

Referring now more particularly to Figs. 1-7 of the drawing, illustrating a preferred embodiment of the present invention, reference numeral 10 denotes a barrel formed of high conductivity metal, such as a suitable copper alloy. One end of the said barrel is somewhat reduced in diameter and is externally threaded as indicated at 11. The threaded end of the barrel is formed with a substantially smooth end face 12 which is at right angles to the axis of the barrel.

On the threaded end of the barrel there is mounted an adaptor nut 14 which is provided with internal threads corresponding to the threaded portion 11 of the barrel. The inner surface of adaptor nut 14 is provided with an internal shoulder 15. The adaptor nut is further provided with a cut-out portion 16 (see Fig. 5), which is obtained by slotting out on tangents from two bore diameters inside of the nut. As it will be best observed in Figs. 5, 6 and 7, the slot from the small diameter is carried from the end adjacent to the small diameter back to a point beyond the small diameter, as indicated at 17. The slot from the large diameter carries from the end of the small slot to a width just great enough to allow the shoulder of a special cap electrode to pass through, as indicated at 18.

The electrode holder of the invention is designed to be used with an electrode of special but simple construction. This electrode or tip comprises a body portion 20 having a work-engaging face 21 and a coolant hole 22 therein, the end of the electrode from which coolant hole 22 opens being formed with a smooth end face 23 which is adapted to conform to end face 12 of the barrel. In the region of said end face, the electrode is provided with a shoulder or flange 24 which is adapted to be engaged by the corresponding shoulder 15 of the adaptor nut. A suitable packing member such as a rubber O ring 25 may be provided in a suitable groove of end face 12 of barrel 10 to further improve the fluid-tight seal between the barrel and the electrode when their respective end faces are pressed together by means of adaptor nut 14.

At the end of barrel 10, opposite to its end carrying adaptor nut 14 and cap electrode 20, there is provided a knurled nut 26 secured to the barrel by means of co-operating threads 27. The end face of knurled nut 26 is adjacent to a corresponding end face of a water connection body or head 28 which is preferably in the form of a casting having an axial bore 29 and two generally radial bores 30 and 31 therein. In axial bore 29 of head 28 is fixed the flared end of a fixed water tube 32, such flared end being pressed against a ledge 33 in the said bore by means of a sleeve 34. The other end of the said fixed tube extends into and through the major portion of the length of barrel 10. A sliding water tube 35 is adjustably arranged within the fixed water tube 32 and has its free end extending a suitable distance into coolant hole 22 of electrode 20.

The water tubes just described are surrounded by a retracting tube 36 of larger diameter, one flared end of which rests on another ledge 37 in bore 29 and also presses against the free end of sleeve 34. The flared end of retracting tube 36 is secured by means of an externally threaded nut 38 engaging a correspondingly threaded and enlarged portion of axial bore 29. A rubber O ring 39 is compressed between the flared end of retracting tube 36 and a groove in ledge 37 thereby preventing leakage between the flow of water through tube 32 and the flow of water through the interspace between tube 32 and retracting tube 36. Conventional inlet and outlet nipples 40 and 41 are respectively threaded into radial bores 30 and 31 of head 28 and serve for the introduction and the discharge of water or some other coolant fluid. It will be noted that inlet nipple 40 is in direct communication with fixed and sliding water tubes 32 and 35, whereas nipple 41 is in communication with the interspace between the said tubes and retracting tube 36 through an opening 42 provided in sleeve 34. Further packing rings, preferably in the form of rubber O rings, are provided to prevent leakage of the coolant fluid. Thus, ring 43, compressed between knurled nut 26 and a groove in barrel 10 prevents leakage at the joint of the said two members and ring 44, together with associated non-extrusion or lubricating washers 51, inserted in a groove in nut 26 provides a sliding but fluid-tight joint between nut 26 and retracting tube 36.

From the foregoing description, the operation of the welding electrode holder of the invention and its cooperation with the cap electrode will be readily understood by those skilled in the art. In the operating position of the holder illustrated in Fig. 1, the internal shoulder 15 of adaptor nut 14 will engage flange or shoulder 24 of cap electrode 20. Thus, the mating end faces 12 and 23 of the barrel and cap electrode respectively will be firmly pressed against each other so that a fluid-tight connection will be maintained between the inner space of the barrel and coolant hole 22 of the electrode. This leak-proof character of the joint will be further improved by packing ring 25 which will be to some extent compressed by the said end faces. As it will be best understood by reference of Fig. 7, shoulder 15 of adaptor nut 14 extends to a distance greater than 180° so that in the assembled condition of the electrode with the barrel, in other words when adaptor nut 14 is tightened, the cap electrode will not only be securely held against the end of the barrel but will also be axially aligned therewith. In addition to this, the diameters of flange or shoulder 24 on electrode 20, shoulder 52 on barrel 10 and bore 53 in nut 14 may be held to close tolerance and concentricity with the outside diameter of barrel 10 to further assure positive alignment of barrel and electrode. This feature is of considerable importance for certain welding applications. The end faces 12 and 23, as a result of their area and pressure contact, provide good electrical connection between barrel 10 and electrode 20. This electrical connection between barrel 10 and electrode 20 may be further improved by silver plating the end faces 12 and 23.

Considering now the flow of coolant fluid, generally water, in the holder, such fluid is introduced into head 28 through nipple 40 from which it will pass through fixed and sliding water tubes 32 and 35 into coolant hole 22 of the welding electrode. Here the flow of coolant fluid is reversed and is then guided along the outer surface of the water tubes into the interspace between water tube 32 and retracting tube 36 and from there through opening 42 in sleeve 34 to outlet nipple 41.

When it is desired to replace cap electrode 20, adapter nut 14 is loosened to a slight extent, such as by rotating it a couple of turns. This will permit shoulder 24 of the cap electrode to be displaced a small distance from internal shoulder 15 of the adaptor nut to reach a region of said nut where its slotted out portion 16 equals approximately 180°. In this position the cap could be readily removed in the lateral direction through the said slot of the adaptor nut except for the end of water tube 35 still extending into the coolant hole of the electrode. Water connection head 28 is now gripped by the operator and the entire cooling system including water tube 35 is withdrawn in the axial direction to an extent sufficient to have the end of the said tube clear end face 23 of the cap electrode. (See Fig. 2.) After this, the cap electrode may be readily removed and may be replaced with a new one. After insertion of the new cap electrode, adaptor nut is tightened and this will automatically fix the new electrode in its operating position. Finally, head 28 and its associated water and retracting tubes are pushed back into their normal operating position whereby the holder and its new electrode are prepared for the welding operation. To facilitate the rotation of the adaptor nut, it is preferred to have its external surface knurled. The knurls on the outside of the nut will give sufficient hand grip of the nut as to allow the entire operation to be performed by hand except for some rare instance where a wrench may be required.

In the operation of the welding electrode holder of the invention it has been found that, particularly when the cooling water or other fluid is supplied at a very high pressure, there is a tendency for head 28 to be pushed out in the axial direction as a result of the internal hydrostatic pressure. This, of course, is undesirable as it would change the distance between the end of water tube 35 and the bottom of coolant hole 22. To avoid this occurrence, a pair of snap rings 45 and 49 in the form of rings of spring metal cut open at one point are mounted in grooves 46 and 50 provided on retracting tube 32. Snap ring 45, located inside nut 26, is adapted to cooperate with a corresponding groove 48 in nut 26 thereby acting as locking means preventing displacement of the retracting tube and of the coolant circulating means associated therewith either accidentally or as a result of the internal pressure. On the other hand, the said snap ring 45 is resilient enough so that it may be expanded and may snap out from groove 46 when head 28 and the associated tubes 32, 35 and 36 are retracted during replacement of an electrode. The groove 47 in nut 26 is of such a diameter as to allow snap ring 49 mounted in groove 50 to enter it, but not large enough to allow the said snap ring to snap out of its groove thereby locking the ring and preventing head 28 and associated tubes 32, 35 and 36 from passing on through nut 26 during retraction.

Fig. 8 is a fragmentary longitudinal sectional view of a modified embodiment of the present invention in which a retracting mechanism of somewhat different construction is used. Barrel 110 has a knurled nut 126 threaded into one of its ends, a fluid-tight joint being assured by the provision of a rubber O ring 143 therebetween. Water connection head 128 is integrally formed with a retracting tube 136 which is slideably arranged within nut 126, the leak-proof character of the sliding fit being assured by rubber O ring 144 and associated non-extrusion or lubricating washers 149. Fixed water tube 132 is threaded into the axial bore 129 of head 128, as indicated at 133 and is in communication with inlet nipple 140, whereas outlet nipple 141 is in communication with the interspace between retracting tube 136 and water tube 132. A strong compression spring 145 is provided around retracting tube 136, one end of the said spring resting on the inner end of nut 126 at 146 and the other end of the said spring resting on a washer 147 held against displacement under spring action by means of a smaller spring washer or locking ring 148 in a groove at the end of the said retracting tube.

In view of the similarity of construction, the operation of this modified embodiment of the invention will be readily understood without any detailed description. It will be sufficient to state that spring 145 will urge head 128, together with the associated water and retracting tubes 132 and 136 towards their normal or operating position from which they may be pulled back by the operator against the pressure of the said spring when it is desired to replace the cap electrode. As a further assurance against undesired outward displacement of the head 128, as caused by the pressure of the coolant fluid, further locking means in the form of the snap ring 45 shown in Fig. 1 may be provided.

Although the present invention has been disclosed in connection with a few preferred embodiments thereof,

What is claimed is:

1. A welding electrode holder comprising a barrel having a threaded portion at one end, an adaptor nut on the threaded portion of the barrel having an inner shoulder engageable with a corresponding shoulder of an electrode with a coolant hole therein to maintain the end faces of the barrel and electrode in pressure contact and in direct electrical connection with each other, said adaptor nut having a tangentially slotted out portion through which the shouldered end of the electrode may be laterally removed upon loosening of the nut, and said end faces of the barrel and of the electrode having an area of contact sufficient to carry heavy welding currents at a negligible voltage drop and to support extremely high welding forces in the axial direction, means for circulating a coolant fluid including a coolant inlet tube extending into said coolant hole of the electrode and a retracting tube slideably mounted in the barrel around said inlet tube, and retracting means for said circulating means operable externally of the barrel to axially withdraw said coolant tube from the coolant hole during lateral removal of the electrode.

2. A welding electrode holder comprising a barrel having a threaded portion at one end and a coolant connection head at the other end, an adaptor nut on the threaded portion of the barrel having an inner shoulder engageable with a corresponding shoulder of an electrode with a coolant hole therein to maintain the end faces of the barrel and electrode in pressure contact and in direct electrical connection with each other, said nut having a slotted out portion through which the shouldered end of the electrode may be laterally removed upon loosening of the nut, and said end faces of the barrel and of the electrode having an area of contact sufficient to carry heavy welding currents at a negligible voltage drop and to support extremely heavy welding forces in the axial direction, a coolant inlet tube fixed in said head at one end and extending through said barrel into said coolant hole of the electrode at its other end, a retracting coolant outlet tube fixed in said head at one end and slideably extending into said barrel, and means associated with said head for maintaining a flow of coolant fluid through said coolant hole through said inlet and outlet tubes, said head and said tubes being axially retractable to permit withdrawal of the end of the coolant inlet tube from the coolant hole during lateral removal of the electrode.

3. The welding electrode holder claimed in claim 2 wherein locking means are provided for maintaining the coolant connection head in its normal unretracted position.

4. A welding electrode holder comprising a barrel having a threaded portion at one end and a coolant connection head at the other end, an adaptor nut on the threaded portion of the barrel having an inner shoulder engageable with a corresponding shoulder of an electrode with a coolant hole therein to maintain the end faces of the barrel and electrode in pressure contact and in direct electrical connection with each other, said nut having a slotted out portion through which the shouldered end of the electrode may be laterally removed upon loosening of the nut and said end faces of the barrel and of the electrode having an area of contact sufficient to carry heavy welding currents at a negligible voltage drop and to support extremely heavy welding forces in the axial direction, a coolant inlet tube fixed in said head at one end and extending through said barrel into said coolant hole of the electrode at its other end, a retracting coolant outlet tube fixed in said head at one end and slidably extending into said barrel, means associated with said head for maintaining a flow of coolant fluid through said coolant hole through said inlet and outlet tubes, said head and said tubes being axially retractable to permit withdrawal of the end of the coolant inlet tube from the coolant hole during lateral removal of the electrode, and resilient means for urging the coolant connection head toward its normal unretracted position.

References Cited in the file of this patent

UNITED STATES PATENTS

| | | |
|---|---|---|
| 1,592,093 | Foucault | July 13, 1926 |
| 1,711,185 | Storm | Apr. 30, 1929 |
| 1,806,788 | Cross | May 26, 1931 |
| 2,271,119 | Cox | Jan. 27, 1942 |
| 2,322,691 | Hensel | June 22, 1943 |
| 2,422,962 | Hensel | June 24, 1947 |
| 2,443,052 | Mullen | June 8, 1948 |
| 2,453,320 | Huebner | Nov. 9, 1948 |